Nov. 6, 1928.

E. P. BULLARD, JR 1,690,568

TURRET HEAD FOR MACHINE TOOLS

Filed June 29, 1925     2 Sheets-Sheet 1

INVENTOR.
Edward P. Bullard, Jr.
BY

ATTORNEYS.

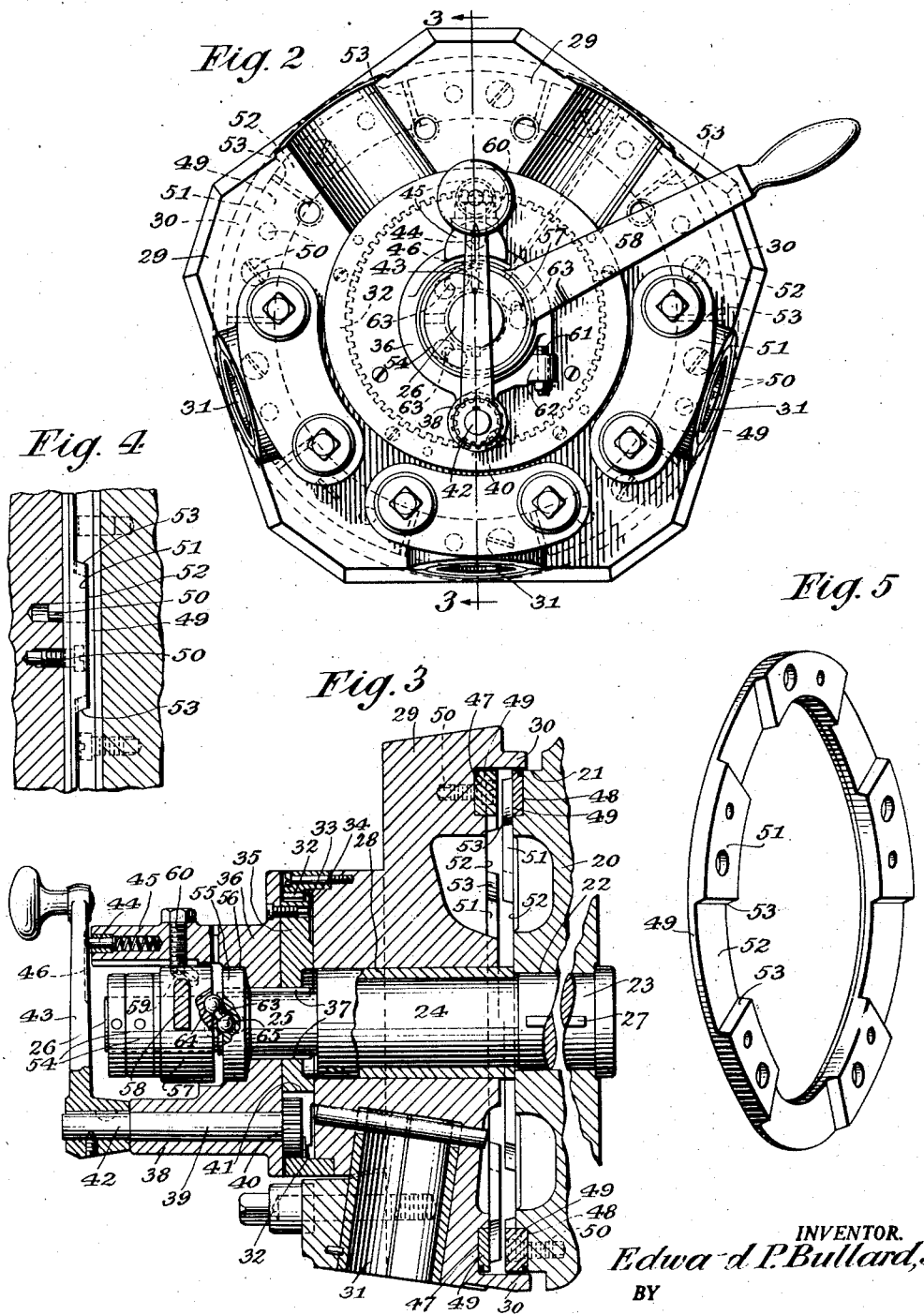

Patented Nov. 6, 1928.

1,690,568

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

TURRET HEAD FOR MACHINE TOOLS.

Application filed June 29, 1925. Serial No. 40,174.

The present invention relates to turret heads for machine tools. as vertical turret lathes, boring mills, and the like, and has for an object to provide improved indexing and locking means for such heads, whereby the same may be locked in its several indexing positions in a positive, accurate, and reliable manner; and further, to provide such means which will be of simple construction and assembly, and which cannot get out of adjustment. To this end it is proposed, in the present embodiment, to provide a pair of cooperating locking rings, each provided with a series of locking portions corresponding to the several tool positions, said portions being fixedly provided on the rings and not subject to relative displacement.

A further object is to provide such locking means having a large bearing surface along radial lines, to the end that the head is rigidly and solidly supported against vibration and chattering.

With the above and other objects in view, an embodiment of the invention is shown in the accompanying drawings, and this embodiment will be hereinafter more fully described with reference thereto, and the invention will be finally pointed out in the claims.

In the drawings:

Fig. 2 is a front elevation of the tool head, according to the present embodiment of the invention, with certain of the tool clamping parts removed;

Fig. 3 is a vertical sectional view, taken along the line 3—3 of Fig. 2, the head being shown in unlocked relation;

Fig. 4 is a sectional detail view of one of the locking portions of the locking rings, and showing the same in locked relation; and Fig. 5 is a perspective view of one of the locking rings.

Similar reference characters indicate corresponding parts throughout the several figures of the drawings.

Figure 1:
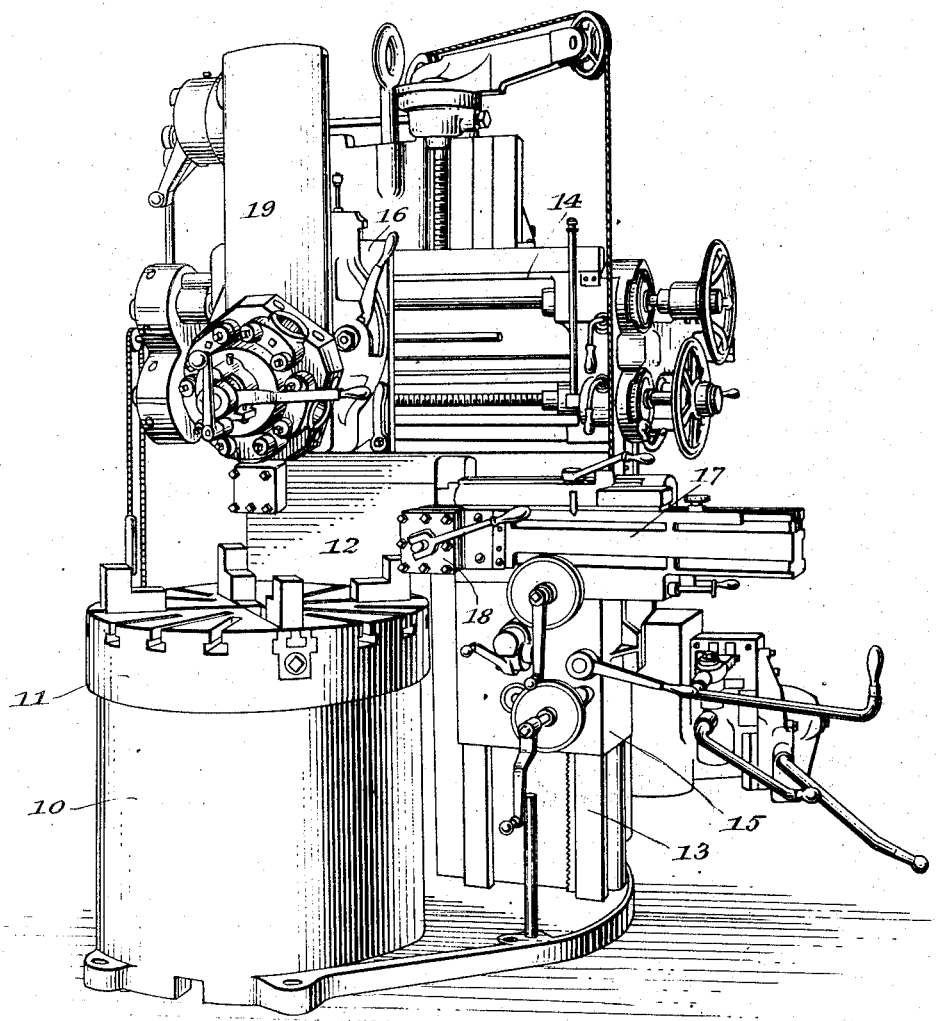
Fig. 1 is a perspective view of a machine tool of the turret lathe type embodying my invention.

Referring to the drawings, and more particularly to Fig. 1 thereof, the turret lathe provided with a turret head, according to the present embodiment of the invention, comprises a base 10 provided with a work carrying chuck table 11 rotatable about a vertical axis, a tool head supporting column 12 extending upwardly from the base at the rear of the table, and being provided with vertical and horizontal slideways 13 and 14 upon which tool supports 15 and 16 are slidably mounted, the support 15 being provided with a horizontal tool slide 17 in which a tool head 18 is slidably mounted, while the support 16 is provided with a vertical slideway 19 carrying a vertically movable head supporting saddle 20, upon which the turret head of the present invention is mounted.

The saddle 20 is provided with a circular bearing portion 21 and centrally of said portion with a cylindrical opening 22, in which there is supported the enlarged and flanged end 23 of a stud 24 projecting forwardly of the saddle and provided at its forward end with a reduced extension 25 and a further reduced extension 26. The stud is held against rotation in the opening 22 by a key 27, and is further held against longitudinal movement by a bushing 28 secured thereon and extending from the shoulder contiguous to the extension 25 to the surface of the saddle, and which with the flanged inner end of the portion 23 engaging the inner end of the saddle fixes the position of the stud.

Upon the stud there is mounted for rotatable and limited longitudinal sliding movement the tool head 29, provided at its inner end with an annular flange 30 rotatably and slidably surrounding the circular bearing 21, and provided radially with spaced tool sockets 31 adapted to accommodate tools of various kinds and forms, as employed in turret heads of this class. There are five of these sockets shown in the present embodiment, thus providing for the use of five different styles of tools, any one of which may be readily swung or indexed to the bottom in proper position for operation, and then secured in such position by the locking means, presently to be described.

At the forward side of the head there is secured an internal ring gear 32, undercut as at 33, and within this undercut there is loosely engaged the annular flange 34 of a plate 35 secured to a cap member 36, this member 36 and the plate 35 being keyed for sliding movement upon the stud extension portion 25 by means of keys 37. The cap member is provided with a bearing portion 38, within which there is journaled a shaft 39 provided at its inner end with a pinion 40 disposed within a pocket 41 in the plate 35 and meshing with the internal gear 32, and provided upon its reduced and projected outer end 42 with a crank handle 43 keyed thereto, this handle adapted to be normally held in a fixed position by means of a spring pressed plunger 44 disposed in a projecting portion 45 of the cap and yieldably engaging a slot 46 in the handle.

By imparting a full turn to the handle the head 29 is adapted through the pinion 40 and gear 32 to be rotated a fifth of a turn to bring the successive tool sockets into operative position, the same being thereupon fixed in such position by the locking means, now to be described.

Upon the opposed surfaces of the head 29 and the saddle 20, and adjacent the inner periphery of the flange 30 and the outer periphery of the annular bearing portion 21, there are provided annular recesses 47 and 48, within which locking rings 49 are secured by means of bolts and dowels 50, these rings being of identical form and provided with spaced projecting portions 51 and recesses 52, the common end walls 53 of which are beveled and radially disposed, the recesses of the respective rings being so dimensioned as to receive the projecting portions of the other. The rings are so disposed that in the operative position of the head the projections of one ring are opposed to the recesses of the other, the head being slid outwardly on the stud during the indexing operation to separate the rings and permit such indexing, and slid inwardly when indexed to lockingly engage the rings, the means for bringing about the latter action adapted to force the head inwardly so that the beveled surfaces engage with a tight wedging action. In such locked position the flat annular surfaces of the rings are spaced, as shown in Fig. 4, so that the head is held along a plurality of equally spaced relatively long radial wedged surfaces. Figs. 2 and 3 show the head in the outwardly moved position to be indexed, with the locking rings separated, while Fig. 4 shows the locking position.

At the end of the extension portion 26 of the stud there are secured retaining abutment collars 54, between which and a collar 55 slidably keyed upon the extension portion 25 within an annular recess 56 of the cap member 36, there is rotatably mounted the hub 57 of a lever handle 58. At the upper side of the hub there is provided a cam groove 59 engaged by a screw stud 60 provided in the portion 45 of the cap 36, and whereby the cap and head are made to positively slide in and out, according to the movements of the lever handle 58, the lever being limited in its upward or unlocking movement by the portion 45, as shown in Figs. 2 and 3, and in its downward or locking movement by an adjustable stop screw 61 provided in a boss 62 of the cap.

Between the hub 57 and the collar 55 there are provided a series of ball-ended toggles 63 engaged in pockets 64 and 65 in the opposed surfaces of these members, and adapted as the head and cap are moved from the unlocked position, as shown, to the locked position, to be forced past the horizontal center line, as shown in dotted lines, the inherent give or elasticity in the wedged locking rings causing the toggles to be held in such position to thereby effect a positive locking of the head. To unlock the head the lever 58 is first forced upwardly with sufficient pressure to move the toggles past their center points, whereupon the locking rings are released and the head may be freely moved through continued movement of the lever. A turning movement of the crank 43 would follow the unlocking of the head to turn the same around to either of its several positions, which is determined primarily by the registration of the plunger 44 with the slot 46 and finally by the locking of it in its fixed and correct position by a throw of the lever handle 58 downwardly, which serves to force the head back against the saddle wedging the locking rings together with the projections of one engaging the recesses of the other.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a machine of the character described, a head support including a stud, a head rotatably mounted on said stud, cooperating locking means carried by said support and head, means for moving said head longitudinally upon the stud to engage and disengage said locking means, and toggle means adapted to maintain the locked relation of said means under pressure in said engaged position.

2. In a machine of the character described, a head support including a stud, a head rotatably mounted on said stud, cooperating locking means carried by said support and head, rotatable means adapted to move said head longitudinally upon the stud to engage and disengage said locking means, non-rotatable means movable longitudinally with said head, and toggle means disposed between said rotatable means and said non-rotatable means adapted to maintain the locked relation of said means under pressure in said engaged position.

3. In a machine of the character described, a head support including a stud, a head rotatably mounted on said stud, cooperating locking means carried by said support and head, rotatable means mounted on said stud adapted to move said head longitudinally upon the stud to engage and disengage said locking means, non-rotatable means on said stud movable longitudinally with said head, and toggle means disposed between said rotatable means and said non-rotatable means adapted to maintain the locked relation of said means under pressure in said engaged position.

4. In a machine of the character described, a head support including a stud, a head rotatably mounted on said stud, cooperating locking means carried by said support and head, rotatable means mounted on said stud adapted to move said head longitudinally upon said stud to engage and disengage said locking means, non-rotatable means on said stud movable longitudinally with said head, and a plurality of toggle means disposed between said rotatable means and said non-rotatable means and circumferentially arranged in equally spaced relation about said stud, adapted to maintain the locked relation of said means under pressure in said engaged position.

5. In a machine of the character described, a head support including a stud, a head rotatably mounted on said stud, cooperating locking means carried by said support and head, rotatable means mounted on said stud adapted to move said head longitudinally upon said stud to engage and disengage said locking means, non-rotatable means on said stud movable longitudinally with said head, and a plurality of ball-ended toggle links disposed between said rotatable means and said non-rotatable means and circumferentially arranged in equally spaced relation about said stud, adapted to maintain the locked relation of said means under pressure in said engaged position.

6. In a machine of the character described, a head support including a stud, a head rotatably mounted on said stud, cooperating locking means carried by said support and head, a handled hub rotatably mounted on the stud and having cam means for moving said head longitudinally upon the stud to engage and disengage said locking means, and toggle means adapted to maintain the locked relation of said means under pressure in said engaged position.

7. In a machine of the character described, a head support including a stud, a head rotatably mounted on said stud, cooperating locking means carried by said support and head, a handled hub rotatably mounted on the stud and having cam means for moving said head longitudinally upon the stud to engage and disengage said locking means, an arm and gear connection for rotating the head and toggle means adapted to maintain the locked relation of said means under pressure in said engaged position.

Signed at Bridgeport, in the county of Fairfield and State of Connecticut, this 26th day of June, A. D. 1925.

EDWARD P. BULLARD, Jr.